(12) United States Patent
Ko et al.

(10) Patent No.: US 9,690,012 B2
(45) Date of Patent: Jun. 27, 2017

(54) ANTI-REFLECTION STRUCTURE AND ELECTRONIC DEVICE

(71) Applicant: InnoLux Corporation, Miao-Li County (TW)

(72) Inventors: Tai-Nien Ko, Miao-Li County (TW); I-Chun Cheng, Miao-Li County (TW); Po-Yuan Chen, Miao-Li County (TW); Yun-Shiuan Li, Miao-Li County (TW); Chia-Yun Chou, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 14/818,131

(22) Filed: Aug. 4, 2015

(65) Prior Publication Data

US 2016/0041309 A1 Feb. 11, 2016

(30) Foreign Application Priority Data

Aug. 5, 2014 (TW) .............................. 103126733 A

(51) Int. Cl.
*G02B 1/00* (2006.01)
*G02B 1/14* (2015.01)
*G02B 1/118* (2015.01)

(52) U.S. Cl.
CPC ................ *G02B 1/14* (2015.01); *G02B 1/118* (2013.01)

(58) Field of Classification Search
CPC . G02B 1/105; G02B 1/11; G02B 1/12; G02B 1/14; G02B 1/18; G02B 1/118; G02F 2261/38; G02F 1/1339

USPC ................... 359/507, 603, 601, 614; 349/16
See application file for complete search history.

(56) References Cited

U.S. PATENT DOCUMENTS

| 7,553,514 B2 | 6/2009 | Fan et al. |
| 2004/0257484 A1* | 12/2004 | Ishitaka ................. G02B 1/11 349/16 |
| 2009/0268301 A1 | 10/2009 | Ooe et al. |
| 2011/0149399 A1 | 6/2011 | Peng et al. |
| 2013/0250425 A1 | 9/2013 | Pett et al. |
| 2015/0299035 A1 | 10/2015 | Kuksenkov |

FOREIGN PATENT DOCUMENTS

| CN | 1573473 | 2/2005 |
| CN | 101501045 A | 8/2009 |
| CN | 101572038 A | 11/2009 |
| CN | 103261812 | 8/2013 |
| TW | 201122536 A1 | 7/2011 |

(Continued)

OTHER PUBLICATIONS

Chinese language office action dated Aug. 3, 2016, issued in application No. CN 201410383559.7.
(Continued)

*Primary Examiner* — Euncha Cherry
(74) *Attorney, Agent, or Firm* — McClure, Qualey & Rodack, LLP

(57) ABSTRACT

An anti-reflection structure includes a substrate including a planar portion, a protrusion portion disposed over the planar portion, and a coating layer, wherein the protrusion portion is integrated with the planar portion, and the coating layer conformably covers the planar portion and the protrusion portion.

12 Claims, 5 Drawing Sheets

(56) References Cited

FOREIGN PATENT DOCUMENTS

TW          201429915       8/2014
WO     WO 2013/171284    11/2013

OTHER PUBLICATIONS

Chinese language office action dated Mar. 10, 2016, issued in application No. TW 103126733.
CN Office Action dated Apr. 17, 2017 in Chines application (No. 201410383559.7).

* cited by examiner

//... 
ANTI-REFLECTION STRUCTURE AND ELECTRONIC DEVICE

CROSS REFERENCE TO RELATED APPLICATIONS

This Application claims priority of Taiwan Patent Application No. 103126733, filed on Aug. 5, 2014, the entirety of which is incorporated by reference herein.

BACKGROUND OF THE INVENTION

Field of the Invention

The invention relates to an optical structure, and in particular to an anti-reflection structure suitable in multiple electronic devices such as displays and solar cells for providing, for example, anti-reflection and anti-smudge functions.

Description of the Related Art

When an electronic device, for example a mobile phone, is used in a bright environment, a reflection of the ambient light of the bright environment on the electronic device may be trigger a trouble like that making the content of the electronic device is difficult to read. In addition, reflection of the ambient light can occur at surfaces of electronic devices such as a display surface of a television, a display surface of a monitor or a solar cell, thereby making it hard for the user to read or degrading the electrical performance of the electronic device.

Accordingly, an anti-reflection coating technique is used in the art to improve the above reflection issues caused by ambient light. Usually one or two thin coating layers are formed on the surface of a transparent substrate in a vacuum chamber to reduce the interference of the reflection of the ambient light. However, since the anti-reflection coating is usually formed on a surface exposed to the environment, such that anti-reflection coating layer is easily affected by dirt and the operations of the users, and therefore defacement and damage can happen to the anti-reflection coating layer, thereby affecting the lifespan of the electronic device. It is desirable to provide an anti-reflection structure with improved mechanical strength and smudge-proof ability of the anti-reflection coating.

BRIEF SUMMARY OF THE INVENTION

An exemplary anti-reflection structure comprises a substrate comprising a planar portion and a protrusion portion disposed over the planar portion, and a coating layer disposed over the substrate. In one embodiment, the protrusion portion is integrated with the planar portion, and the coating layer covers the protrusion portion and the planar portion.

An exemplary electronic device comprises a first substrate, a second substrate disposed over the first substrate, and a liquid-crystal layer, a touch-sensing layer, or a photovoltaic element disposed between the first substrate and the second substrate. In one embodiment, the second substrate comprises the above anti-reflection structure.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the embodiment of carrying out the invention. This description is made for the purpose of illustrating the general principles of the invention and should not be taken in a limiting sense. The scope of the invention is best determined by reference to the appended claims.

FIGS. 1-4 are schematic cross-sectional views showing a method for forming an anti-reflection structure according to an embodiment of the invention.

Figure 1:
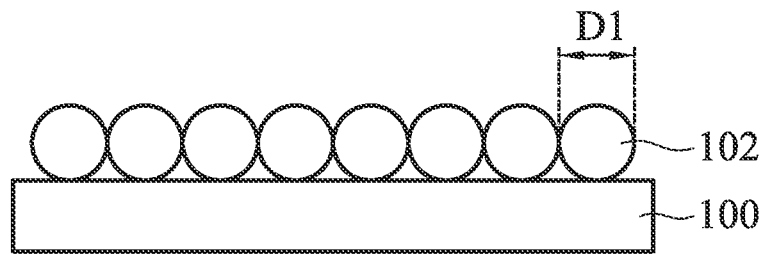
FIGS. 1-4 are schematic cross-sectional views showing a method for forming an anti-reflection structure according to an embodiment of the invention.

As shown in FIG. 1, a substrate 100 is provided first. The substrate 100 may comprise transparent material such as glass, polymethylmethacrylate (PMMA), polyethylene terephthalate (PET), or polyimide (PI). Next, a plurality of spheres 102 having the similar diameter D1 are disposed on a surface of the substrate 100 by methods such as Langmuir-Blodgett coating (LB coating), Langmuir-Schaefer coating (LS coating), dip coating, or self-assembly monolayers (SAMs), but they are not limited thereto. As shown in FIG. 1, the diameter D1 of the spheres 102 can be about 200-400 nm, and the spheres 102 may have a tolerance of plus or minus 25% on the diameter D1. The spheres 102 may comprise materials such as polystyrene (PS), polyethylene (PE), polyvinylchloride (PVC) or $SiO_2$. The spheres 102 disposed on the substrate 100 are close to each other, such that the spheres 102 physically contact with each.

Figure 2:
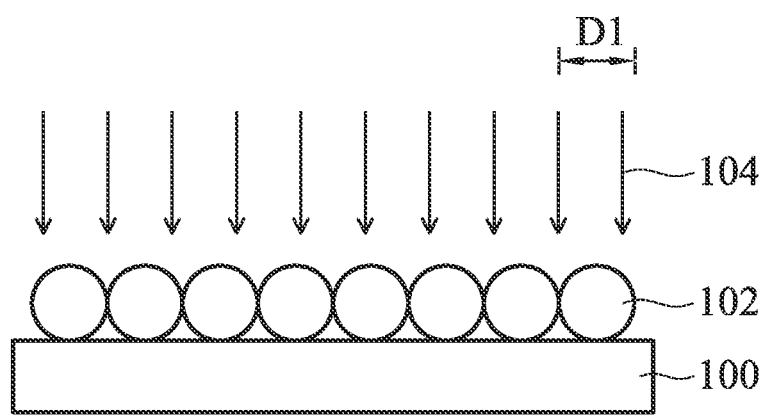

In FIG. 2, an etching process 104 is performed next on the structure shown in FIG. 1. The etching process 104 can be, for example, a dry etching such as a plasma etching, and the etchants (not shown) used in the etching process 104 can be adjusted according to the material of the spheres 102. In one embodiment, the etching process 104 may use etchants comprising trifluoromethane ($CHF_3$) or tetrafluoromethane ($CF_4$) when the spheres 102 comprising polyvinylchloride (PVC). During the etching process 104, the etchants not only penetrate space between the spheres 102 to isotropically remove portions of the substrate 100 under the spheres 102, but also simultaneously isotropically removes portions of the spheres 102.

Figure 3:
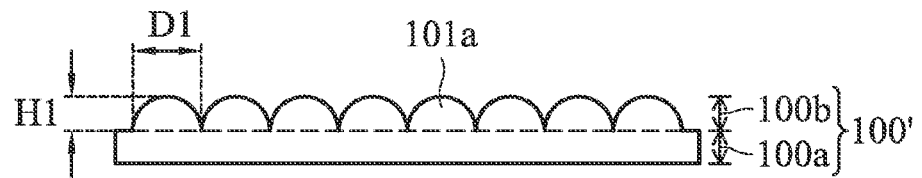

As shown in FIG. 3, after the etching process 104 shown in FIG. 2 is performed, another etching process (not shown), for example a wet etching process, is then performed to remove the portions of the spheres 102 remaining on the substrate 100 and clean the substrate 100. In one embodiment, etchants (not shown) such as sulfuric acid and hydrogen peroxide can be used to remove the portions of the sphere 102 remaining over the substrate 100 and clean the substrate 100 as the spheres 102 comprise polyvinylchloride (PVC).

As shown in FIG. 3, the substrate 100 being processed by the above etching processes now forms a substrate 100', having a protrusion portion 100b and a planar portion 100a underlying the protrusion portion 100b. The protrusion portion 100b comprises a plurality of first protrusions 101a, and the protrusion portion 100b and the planar portion 100a underlying the protrusion portion 100b are formed of the same transparent materials and are integrated with each other. The first protrusion portions 101a may have a cross-section of a semicircular or semicircular-like configuration similar to portions of the surface of the spheres 102. The first protrusion portions 101a may have a width (also entitled as D1) of about 195-400 nm similar with the diameter D1 of the spheres 102 and a height H1 of about 50-250 nm. It should be noted that the first protrusions 101a are closely proximate to each other, such that the first protrusions 101a physically contact with each other.

Figure 4:
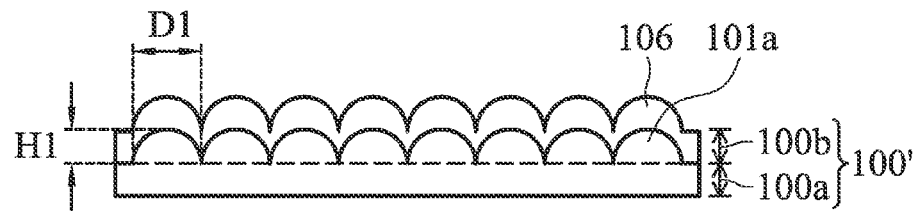

In FIG. 4, a coating layer 106 is next formed over the structure shown in FIG. 3. The coating layer 106 can be, for example, an anti-smudge layer. In one embodiment, the coating layer 106 may comprise materials such as per-fluorinated polyethers (PFPE), alkylflouride, or alkylhalide, and can be conformably formed over the exposed surface of the protrusion portion 100b and the planar portion 100a of the substrate 100' shown in FIG. 3 by methods such as dip coating, spray coating or evaporation. In addition, the coating layer 106 may have a thickness of about 1-100 nm.

Herein, as shown in FIG. 4, an exemplary anti-reflection structure is substantially fabricated. FIG. 4 illustrates an exemplary anti-reflection structure, in which the adjacent first protrusions 101a formed over the substrate 100' made of transparent material form an anti-reflection structure similar to a moth-eye structure, such that the anti-reflection structure is able to reduce reflection in the visible light wavelength band and has a reflectivity no greater than 0.65% in the visible light wavelength band (400-800 nm).

In addition, in the anti-reflection structure shown in FIG. 4, due to formation of the coating layer 106, the surface of the coating layer 106 may have a contact angle greater than 110° and 55° to liquids such as water and n-hexadecane, respectively, thereby having anti-smudge and self-cleaning properties.

Moreover, since the protrusion portion 100b and the planar portion 100a of the substrate 100' of the anti-reflection structure shown in FIG. 4 are integrated with each other and are made of the same material, such that the protrusion portion 100b and the planar portion 100a are well connected and show a mechanical property greater than the conventional anti-reflection structure made of a transparent substrate and an anti-reflection coating of different materials formed thereon. Accordingly, the anti-reflection structure shown in FIG. 4 also has good wear-resistance properties.

Figure 5:
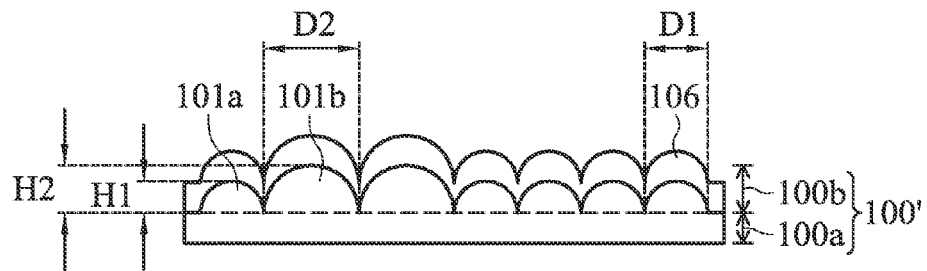
FIG. 5 is a schematic cross-sectional view showing an anti-reflection structure according to another embodiment of the invention.

FIG. 5 is a schematic cross-sectional view showing an anti-reflection structure according to another embodiment of the invention. The anti-reflection structure shown in FIG. 5 is modified from the anti-reflection structure shown in FIG. 4. For the purpose of simplicity, only differences between the anti-reflection structures shown in FIGS. 4-5 are discussed bellow.

As shown in FIG. 5, the protrusion portion 100b is disposed over the planar portion 100a of the substrate 100' of the anti-reflection structure, and comprises a plurality of first protrusions 101a and a plurality of second protrusions 101b. The second protrusions 101b have a height H2 and a width D2 greater than that of the first protrusions 101a. Fabrication of the second protrusions 101b can be formed by using the plurality of spheres 102 having two kinds of spheres of different sizes, and the spheres 102 may comprise a plurality of first spheres (not shown) having a diameter D1 of about 195-400 nm, and a plurality of second spheres (not shown) having a diameter D2 of about 280-400 nm, and the fabrications shown in FIGS. 2-4 are performed to form the anti-reflection structure shown in FIG. 5. The first protrusions 101a may have a cross-section of semicircular or semicircular-like configuration substantially similar with the first spheres (not shown), and have a width (also shown as D1) of about 195-400 nm and a height H1 of about 50-250 nm. The second protrusions 101b may have a cross-section of a semicircular or semicircular-like configuration substantially similar with the second spheres (not shown) and have a width (shown as D2) of about 280-400 nm and a height H2 of about 50-250 nm.

It should be noted that the first protrusions 101a and the second protrusions 101b are closely proximate to each other, such that the first protrusions 101a and the second protrusions 101b physically contact with each other.

In one embodiment, the amount of first spheres (not shown) used for forming the anti-reflection structure shown in FIG. 5 is about 0.1-99% of the total amount of the spheres 102, and the amount of second spheres (not shown) used for forming the anti-reflection structure shown in FIG. 5 is about 0.1-99% of the total amount of spheres 102, such that the first protrusions 101a in the anti-reflection structure occupy about 0.1-99.9% of the total surface of a total area, and the second protrusions 101b of the anti-reflection structure occupy about 0.1-99.9% of the total surface of the total area.

Figure 6:
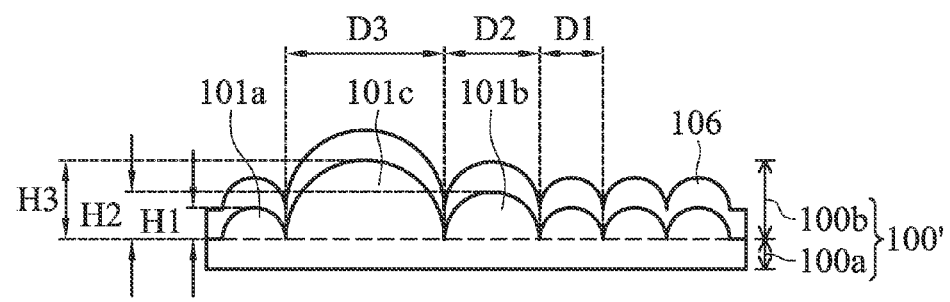
FIG. 6 is a schematic cross-sectional view showing an anti-reflection structure according to yet another embodiment of the invention.

FIG. 6 is a schematic cross-sectional view showing an anti-reflection structure according to yet another embodiment of the invention. The anti-reflection structure shown in FIG. 6 is modified from the anti-reflection structure shown in FIG. 4. For the purpose of simplicity, only differences between the anti-reflection structures shown in FIGS. 4 and 6 are discussed bellow.

As shown in FIG. 6, the protrusion portion 100b is disposed over the planar portion 100a of the substrate 100' of the anti-reflection structure, and comprises a plurality of first protrusions 101a, a plurality of second protrusions 101b, and a plurality of third protrusions 101c. The third protrusions 101c have a height H3 and a width D3 greater than that of the first protrusions 101a and the second protrusion 101b, and the second protrusions 101b have a height H2 and a width D2 greater than that of the first protrusions 101a.

Fabrication of the first protrusions 101a, the second protrusions 101b, and the protrusions 101c can be formed by using the plurality of spheres 102 having three kinds of spheres of different sizes, and the spheres 102 may comprise a plurality of first spheres (not shown) having a diameter D1 of about 195-245 nm, a plurality of second spheres (not shown) having a diameter D2 of about 280-330 nm, and a plurality of third spheres (not shown) having a diameter D3 of about 350-400 nm, and the fabrications shown in FIGS. 2-4 are performed next to form the anti-reflection structure shown in FIG. 6.

The first protrusions 101a may have a semi-sphere or semi-sphere like cross-sectional configuration substantially similar with the first spheres (not shown), and have a width (also shown as D1) of about 195-245 nm and a height H1 of about 50-250 nm. The second protrusions 101b may have a cross-section of a semicircular or semicircular-like configuration substantially similar with the second spheres (not shown) and have a width (shown as D2) of about 280-330 nm and a height H2 of about 50-250 nm. The third protrusions 101c may have a cross-section of a semicircular or semicircular-like configuration substantially similar with the third spheres (not shown) and have a width (shown as D3) of about 350-400 nm and a height H3 of about 50-250 nm. It is noted that the first protrusions 101a, the second protrusions 101b, and the third protrusions 101c are closely proximate to each other, such that the first protrusions 101a, the second protrusions 101b, and the third protrusions 101c physically contact with each other.

In one embodiment, an amount the first spheres (not shown) used for forming the anti-reflection structure shown in FIG. 6 is about 60-98% of the total amount of the spheres 102, the second spheres (not shown) used for forming the anti-reflection structure shown in FIG. 6 is about 1-20% of the total amount of the spheres 102, and the third spheres (not shown) used for forming the anti-reflection structure shown in FIG. 6 is about 1-20% of the total amount of the spheres 102, such that the first protrusions 101a in the anti-reflection structure occupy about 60-98% of the total surface of a total area, the second protrusions 101b of the anti-reflection structure occupy about 1-20% of the total surface of the total area, and the third protrusions 101c of the anti-reflection structure occupy about 1-20% of the total surface of the total area.

Similarly, the anti-reflection structures shown in FIG. 5-6 also have the properties of low reflection rate, anti-smudge and self-clean as that of the anti-reflection structure shown in FIG. 4, and have a mechanical strength greater than the conventional anti-reflection structure made of a transparent substrate and an anti-reflection coating of different materials formed thereon.

Figure 7:
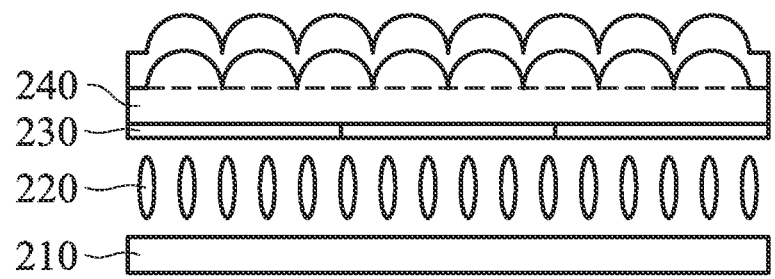
FIG. 7 is a schematic cross-sectional view showing an electronic device according to an embodiment of the invention, comprising the anti-reflection structure shown in FIG. 4.

FIG. 7 is a schematic cross sectional view showing an electronic device 200 according to an embodiment of the invention, using the anti-reflection structure shown in FIG. 4.

As shown in FIG. 7, the electronic device 200 can be used in applications such as display devices and comprises a first substrate 210, a second substrate 240, a liquid crystal layer 220 disposed between the first substrate 210 and the second substrate 240, and a color filter layer 230 disposed on a surface of second substrate 240 adjacent to the liquid crystal layer 220.

In this embodiment, the second substrate 240 can be a transparent substrate contacting the surroundings and may thus have the anti-reflection structure shown in FIG. 4, such that the electronic device 200 having the anti-reflection structure shown in FIG. 4 may have the properties of low reflection rate, anti-smudge and self-clean as that of the anti-reflection structure shown in FIG. 4, and have a mechanical property greater than the conventional anti-reflection structure made of a transparent substrate and an anti-reflection coating of different materials formed thereon. Herein, due to the purpose of simplicity, components in the second substrate 240 are similar with that shown in FIG. 4 and are not described in detail. Other components in the electronic device 200 can be components used in a conventional liquid crystal display device, and are not described here in detail.

Figure 8:
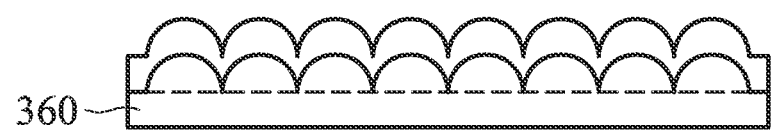
FIG. 8 is a schematic cross-sectional view showing an electronic device according to another embodiment of the invention, comprising the anti-reflection structure shown in FIG. 4.
Figure 8:
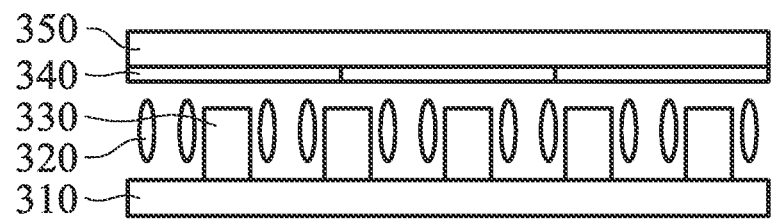

FIG. 8 is a schematic cross sectional view showing an electronic device 300 according to another embodiment of the invention, using the anti-reflection structure shown in FIG. 4.

As shown in FIG. 8, the electronic device 300 can be used in applications such as touch-sensing type display devices and comprises a first substrate 310, a second substrate 360, a third substrate 350 disposed between the first substrate 310 and the second substrate 360, a liquid crystal layer 320 disposed between the first substrate 310 and the third substrate 350, a plurality of touch-sensing elements 330 disposed over a surface of the first substrate 310 adjacent to the liquid crystal layer 320, and a color filter layer 340 disposed over a surface of the third substrate 350 adjacent to the liquid crystal layer 320. The space between the second substrate 360 and the third substrate 350 is filled with air or optical glues to separate the second substrate 360 and the third substrate 350.

In this embodiment, the second substrate 360 can be a transparent substrate contacting the surroundings and may thus have the anti-reflection structure shown in FIG. 4, such that the electronic device 300 having the anti-reflection structure shown in FIG. 4 may have the properties of low reflection rate, anti-smudge and self-clean as that of the anti-reflection structure shown in FIG. 4, and have a mechanical property greater than the conventional anti-reflection structure made of a transparent substrate and an anti-reflection coating of different materials formed thereon. Herein, for the purpose of brevity, components in the second substrate 360 are similar with that shown in FIG. 4 and are not described in detail here. Other components in the electronic device 300 can be components used in conventional touch-sensing type liquid crystal display device, and are not described here in detail.

Figure 9:
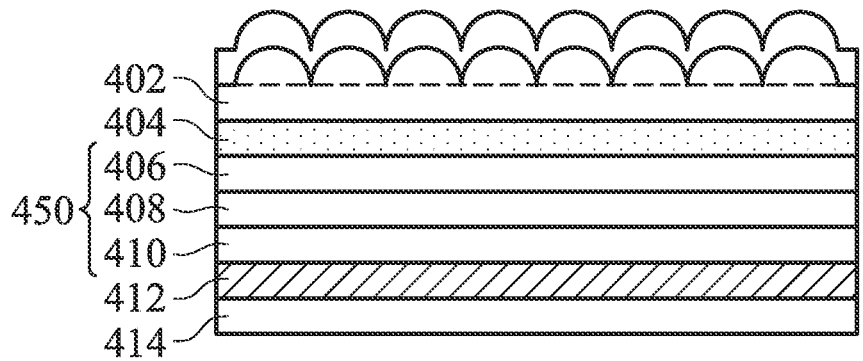
FIG. 9 is a schematic cross-sectional view showing an electronic device according to yet another embodiment of the invention, comprising the anti-reflection structure shown in FIG. 4.

FIG. 9 is a schematic cross sectional view showing an electronic device 400 according to an embodiment of the invention, using the anti-reflection structure shown in FIG. 4.

As shown in FIG. 9, the electronic device 400 can be used in applications such as solar cell devices and comprises a first substrate 414, a second substrate 402, and an electrode layer 412, a photovoltaic element 450 and a transparent conductive layer 404 sequentially disposed on the first substrate 414 and located between the first substrate 414 and the second substrate 402. In one embodiment, the photovoltaic element 450 comprises an n-type amorphous silicon layer 410, and intrinsic amorphous silicon layer 408, and a p-type amorphous silicon layer 406 sequentially stacked over the electrode layer 412.

In this embodiment, the second substrate 402 can be a transparent substrate contacting the surroundings and may thus have the anti-reflection structure shown in FIG. 4, such that the electronic device 400 having the anti-reflection structure shown in FIG. 4 may have the properties of low reflection rate, anti-smudge and self-clean as that of the anti-reflection structure shown in FIG. 4, and have a mechanical property greater than the conventional anti-reflection structure made of a transparent substrate and an anti-reflection coating of different materials formed thereon. Herein, due to the purpose of simplicity, components in the second substrate 402 are similar with that shown in FIG. 4 and are not described in detail here. Other components in the electronic device 400 that are components used in conventional solar cell devices are not described here in detail.

Figure 10:
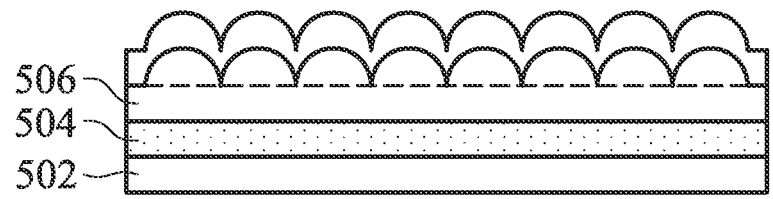
FIG. 10 is a schematic cross-sectional view showing an electronic device according to another embodiment of the invention, comprising the anti-reflection structure shown in FIG. 4.

FIG. 10 is a schematic cross sectional view showing an electronic device 500 according to yet another embodiment of the invention, using the anti-reflection structure shown in FIG. 4.

As shown in FIG. 10, the electronic device 500 can be used in applications such as touch-sensing modules and comprises a first substrate 502, a second substrate 506, and a touch-sensing layer 504 disposed between the first substrate 502 and the second substrate 506. In this embodiment, the second substrate 506 can be a transparent substrate contacting the surroundings and may thus have the anti-reflection structure shown in FIG. 4, such that the electronic device 500 having the anti-reflection structure shown in FIG. 4 may have the properties of a low reflection rate, anti-smudge and self-clean as that of the anti-reflection structure shown in FIG. 4, and have a mechanical property greater than the conventional anti-reflection structure made of a transparent substrate and an anti-reflection coating of different materials formed thereon. Herein, due to the purpose of simplicity, components in the second substrate 506 are similar with that shown in FIG. 4 and are not described in detail here.

The anti-reflection structure used in the electronic devices 200, 300, 400, and 500 shown in FIGS. 7-10, respectively, is not limited to that shown in FIG. 4. In other embodiments, the anti-reflection structure shown in FIGS. 5-6 can be also used in the electronic devices 200, 300, 400, and 500 shown in FIGS. 7-10.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An anti-reflection structure, comprising:
   a substrate comprising a planar portion and a protrusion portion disposed over the planar portion, wherein the protrusion portion is integrated with the planar portion; and
   a coating layer disposed on the substrate, covering the protrusion portion and the planar portion, wherein the protrusion portion is between the planar portion and the coating layer.

2. The anti-reflection structure as claimed in claim 1, wherein the protrusion portion has a cross-section of semi-circular or semicircular-like configuration.

3. The anti-reflection structure as claimed in claim 2, wherein the protrusion portion comprises a plurality of first protrusions, and the first protrusions have a width of about 195-400 nm and a height of about 50-250 nm.

4. The anti-reflection structure as claimed in claim 2, wherein the protrusion portion comprises at least two different protrusions.

5. The anti-reflection structure as claimed in claim 4, wherein the protrusion portion comprises a plurality of first protrusions and a plurality of second protrusions, wherein the first protrusions have a width of about 195-400 nm and a height of about 50-250 nm, and the second protrusions have a width of about 280-400 nm and a height of about 50-250 nm.

6. The anti-reflection structure as claimed in claim 4, wherein the protrusion portion comprises a plurality of first protrusions, a plurality of second protrusions, and a plurality of third protrusions, wherein the first protrusions have a width of about 195-245 nm and a height of about 50-250 nm, the second protrusions have a width of about 280-330 nm and a height of about 50-250 nm, and the third protrusions have a width of about 350-400 nm and a height of about 50-250 nm.

7. The anti-reflection structure as claimed in claim 6, wherein the first protrusions occupy about 60%-98% of a total surface area, and the second protrusions occupy about 1%-20% of the total surface area, and the third protrusions occupy about 1%-20% of the total surface area.

8. The anti-reflection structure as claimed in claim 1, wherein the substrate comprises glass, polymethyl methacrylate, polyethylene terephthalate, or polyimide.

9. The anti-reflection structure as claimed in claim 1, wherein the coating layer comprises per-fluorinated polyethers, alkylfluoride, or alkylhalides.

10. An electronic device, comprising:
    a first substrate;
    a second substrate disposed over the first substrate, wherein the second substrate comprising a planar portion and a protrusion portion disposed over the planar portion, wherein the protrusion portion is integrated with the planar portion;
    a coating layer disposed on the second substrate, covering the protrusion portion and the planar portion, wherein the protrusion portion is between the planar portion and the coating layer; and
    a liquid crystal layer, a touch-sensing layer, or a photovoltaic element disposed between the first substrate and the second substrate.

11. The anti-reflection structure as claimed in claim 1, wherein the protrusion portion is in direct contact with the coating layer.

12. The electronic device as claimed in claim 10, wherein the protrusion portion is in direct contact with the coating layer.

* * * * *